(12) United States Patent
Lee (10) Patent No.: US 7,591,070 B2
(45) Date of Patent: Sep. 22, 2009

(54) TURBINE BLADE TIP SQUEALER AND REBUILD METHOD

(75) Inventor: Ching-Pang Lee, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 260 days.

(21) Appl. No.: 11/766,488

(22) Filed: Jun. 21, 2007

(65) Prior Publication Data
US 2007/0277361 A1   Dec. 6, 2007

Related U.S. Application Data

(62) Division of application No. 10/970,031, filed on Oct. 21, 2004, now Pat. No. 7,270,514.

(51) Int. Cl.
*B23P 15/02* (2006.01)
*F01D 5/20* (2006.01)

(52) U.S. Cl. ........... 29/889.1; 29/889.72; 29/889.71; 29/721; 416/92; 416/97 R (58) Field of Classification Search ........ 29/889.721, 29/889.72, 889.722, 889.71, 889.7, 889, 29/889.1, 889.2; 415/115, 116, 173.1, 173.4; 416/92, 96 A, 96 R, 97 R, 224
See application file for complete search history.

(56) References Cited

U.S. PATENT DOCUMENTS

| 4,390,320 | A | | 6/1983 | Eiswerth | |
| 5,261,789 | A | * | 11/1993 | Butts et al. | 416/96 R |
| 5,584,663 | A | * | 12/1996 | Schell et al. | 416/241 R |
| 5,822,852 | A | * | 10/1998 | Bewlay et al. | 29/889.1 |
| 6,059,530 | A | | 5/2000 | Lee | |
| 6,179,556 | B1 | * | 1/2001 | Bunker | 415/115 |
| 6,190,129 | B1 | | 2/2001 | Mayer et al. | |
| 6,422,821 | B1 | | 7/2002 | Lee et al. | |
| 6,554,575 | B2 | | 4/2003 | Leeke et al. | |
| 6,672,829 | B1 | | 1/2004 | Cherry et al. | |
| 6,790,005 | B2 | | 9/2004 | Lee et al. | |
| 6,971,851 | B2 | | 12/2005 | Liang | |
| 6,991,430 | B2 | | 1/2006 | Stec et al. | |
| 2005/0091848 | A1 | * | 5/2005 | Nenov et al. | 29/889.1 |
| 2006/0218788 | A1 | * | 10/2006 | Boulnois et al. | 29/889.72 |

* cited by examiner

*Primary Examiner*—David P Bryant
*Assistant Examiner*—Ryan J Walters
(74) *Attorney, Agent, or Firm*—Adams Intellectual Property Law, P.A.; Janice Whitlow (57) ABSTRACT

A turbine blade with a tip squealer and method of rebuilding a turbine blade for a gas turbine engine. The blade is of the type including an airfoil having first and second spaced-apart sidewalls defining an interior void and joined at a leading edge and a trailing edge. The first and second sidewalls extending from a root disposed adjacent the dovetail to a tip cap for channeling combustion gases, and a squealer tip including at least one tip rib extending outwardly from the tip cap. The method includes the steps of removing the squealer tip, including the at least one rib tip, from the tip cap and adding new material to the tip cap to serve as a new squealer tip. A plurality of spaced-apart notches is formed in the new material between the leading edge and the trailing edge of the airfoil. At least one hole is formed in each notch communicating with the interior void of the airfoil for channeling cooling air from the interior void of the airfoil to thereby form a squealer tip.

7 Claims, 8 Drawing Sheets

TURBINE BLADE TIP SQUEALER AND REBUILD METHOD

This is a divisional application of U.S. patent application Ser. No. 10/970,031, filed on Oct. 21, 2004, now U.S. Pat. No. 7,210,514.

TECHNICAL FIELD AND BACKGROUND OF THE INVENTION

The present invention relates generally to turbine blades for a gas turbine engine and, in particular, to a method of rebuilding the tips of continuous incline turbine blades, and the resulting rebuilt blade.

It is well known that air is pressurized in a compressor of a gas turbine engine and mixed with fuel in a combustor to generate hot combustion gases. These gases flow downstream through one or more turbines where energy is extracted. In a typical turbine, a row of circumferentially spaced-apart rotor blades extend radially outwardly from a supporting rotor disk. Each blade typically includes a dovetail which permits assembly and disassembly of the blade in a corresponding dovetail slot in the rotor disk, as well as an airfoil which extends radially outwardly from the dovetail.

The airfoil has a generally concave pressure side and generally convex suction side extending axially between corresponding leading and trailing edges and radially between a root and a tip. The blade tip is closely spaced in relation to an outer turbine shroud for minimizing leakage of the combustion gases flowing downstream between the turbine blades. Maximum efficiency of the engine is obtained by minimizing the tip clearance, but is limited by the differential thermal and mechanical expansion and contraction coefficients between the rotor blades and the turbine shroud. Sufficient spacing must be maintained in order to minimize the occurrence of undesirable contact between the blade tip and the turbine shroud.

The turbine blades are bathed in hot combustion gases, and effective cooling is therefore required in order to extend the useful life of the blade. The blade airfoils are hollow and disposed in flow communication with the compressor so that pressurized air may be bled from the compressor and used in cooling the airfoils. Airfoil cooling is quite sophisticated and may be effected using various forms of internal cooling channels and features, as well as cooling holes through the walls of the airfoil for discharging the cooling air.

The blade tip is particularly difficult to cool since it is located directly adjacent to the turbine shroud and the hot combustion gases which flow through the tip gap. Accordingly, a portion of the air channeled inside the blade is typically discharged through the tip for cooling. The tip typically includes a continuous radially outwardly projecting edge rib formed coextensively along the pressure and suction sides between the leading and trailing edges. The tip rib follows the aerodynamic contour around the blade and is a significant contributor to the aerodynamic efficiency of the blade.

Generally, the tip rib has portions spaced-apart on the opposite pressure and suction sides to define an open top tip cavity. A tip cap extends between the pressure and suction side ribs and encloses the top of the blade for containing the cooling air. Tip holes are also provided which extend through the floor for cooling the tip and filling the tip cavity.

Several patents relate to the cooling of turbine blade tips, including: U.S. Pat. No. 5,261,789 to Butts et al.; U.S. Pat. No. 6,179,556 to Bunker; U.S. Pat. No. 6,190,129 to Mayer et al.; U.S. Pat. No. 6,059,530 to Lee and U.S. Pat. No. 6,672,829 to Cherry et al. These patents disclose various blade tip configurations which include an offset on the pressure and/or suction sides in order to increase flow resistance through the tip gap.

In particular, U.S. Pat. No. 6,672,829 discloses a turbine blade tip that alters the pressure distribution near the tip region to reduce the overall tip leakage flow and thereby increase the efficiency of the turbine. The blade tip develops a recirculation zone adjacent the ribs in order to improve the flow characteristics and pressure distribution at the tip region. This is accomplished by means of an inclined squealer and a shielded film shelf. It is anticipated that the tip region of the blade will require several rebuilds during the service life of the blade. A practical way of carrying out these rebuild procedures is necessary to achieve the full advantage of this new blade. This application discloses the use of electrical discharge machining (EDM) to carry out this rebuild process, and the resultant turbine blade with discrete film shelf notches.

BRIEF DESCRIPTION OF THE INVENTION

In one embodiment of the invention, a turbine blade for a gas turbine engine is disclosed, and includes an airfoil and integral dovetail for mounting the airfoil along a radial axis to a rotor disk inboard of a turbine shroud. The airfoil includes first and second sidewalls joined together at a leading edge and a trailing edge, where the first and second sidewalls extend from a root disposed adjacent the dovetail to a tip cap for channeling combustion gases thereover. At least one tip rib extends outwardly from the tip cap between the leading and trailing edges. The turbine blade tip on the pressure side is provided with multiple discrete open notches.

In an embodiment of the method of the invention, a turbine blade for a gas turbine engine is disclosed and includes an airfoil and integral dovetail for mounting the airfoil along a radial axis to a rotor disk inboard of a turbine shroud. The airfoil further includes first and second sidewalls joined together at a leading edge and a trailing edge, where the first and second sidewalls extend from a root disposed adjacent the dovetail to a tip cap for channeling combustion gases. In repairing the blade tip, the damaged squealer is ground off and replacement material is welded into place. A wedge-shaped electrode is used with an EDM process to form wedge-shaped notches on the new squealer. Film cooling holes are drilled into the shelf of the notches.

According to one aspect of the invention a method of rebuilding a turbine blade for a gas turbine engine is disclosed, the blade being of the type including an airfoil having first and second spaced-apart sidewalls defining an interior void and joined at a leading edge and a trailing edge. The first and second sidewalls extend from a root disposed adjacent the dovetail to a tip cap for channeling combustion gases thereover, and a squealer tip including at least one tip rib extends outwardly from the tip cap. The method includes the steps of removing the squealer tip, including the at least one rib tip, from the tip cap and adding new material to the tip cap to serve as a new squealer tip. A plurality of spaced-apart notches are formed in the new material between the leading edge and the trailing edge of the airfoil, and at least one hole is formed in each notch communicating with the interior void of the airfoil for channeling cooling air from the interior void of the airfoil to thereby form a squealer tip.

According to another aspect of the invention, the step of removing the squealer tip from the airfoil includes the step of grinding the squealer tip off of the airfoil.

According to another aspect of the invention, the step of adding new material to the tip cap to serve as a new squealer tip comprises the step of welding at least one metal blank onto the tip cap.

According to another aspect of the invention, the step of forming a plurality of spaced-apart notches in the new material between the leading edge and the trailing edge of the airfoil comprises the steps of providing EDM electrodes having a predetermined shape suitable for forming the notches, applying the EDM electrodes to predetermined positions on the airfoil, and utilizing the EDM electrodes to electrically discharge machine-form the notches into the new material.

According to another aspect of the invention, the step of forming at least one hole in each notch comprises the step of drilling the hole.

According to another aspect of the invention, the step of forming the at least one hole comprises the step of drilling a plurality of holes in each notch.

According to another aspect of the invention, the step of forming a plurality of spaced-apart notches in the new material comprises the steps of providing EDM electrodes having a predetermined shape suitable for forming the notches, and applying the EDM electrodes to the new material in a spaced-apart, longitudinally-extending array between the leading edge and the trailing edge of the airfoil proximate a top edge thereof. The EDM electrodes are utilized to electrically discharge machine-form the notches into the new material.

According to another aspect of the invention, a method is provided for constructing a turbine blade for a gas turbine engine, the blade being of the type including an airfoil having first and second spaced-apart sidewalls defining an interior void and joined at a leading edge and a trailing edge, the first and second sidewalls extending from a root disposed adjacent the dovetail to a tip cap for channeling combustion gases thereover and a squealer tip including at least one tip rib extending outwardly from the tip cap. The method comprises the steps of metal casting the blade, including the airfoil, forming a plurality of spaced-apart notches in the airfoil proximate the tip, and forming at least one hole in each notch communicating with the interior void of the airfoil for channeling cooling air from the interior void of the airfoil to thereby form a squealer tip.

According to another aspect of the invention, the step of forming a plurality of spaced-apart notches comprises the steps of providing EDM electrodes having a predetermined shape suitable for forming the notches, and applying the EDM electrodes to predetermined positions on the airfoil. The EDM electrodes are utilized to electrically discharge machine-form the notches into the airfoil.

According to another aspect of the invention, the step of forming a plurality of spaced-apart notches in the airfoil comprises the steps of providing EDM electrodes having a predetermined shape suitable for forming the notches and applying the EDM electrodes to the airfoil in a spaced-apart, longitudinally-extending array between the leading edge and the trailing edge proximate a top edge thereof The EDM electrodes are utilized to electrically discharge machine-form the notches into the airfoil.

According to another aspect of the invention, a turbine blade for a gas turbine engine is provided, comprising an airfoil having first and second spaced-apart sidewalls defining an interior void and joined at a leading edge and a trailing edge. The first and second sidewalls extend from a root positioned adjacent a dovetail to a tip cap for channeling combustion gases thereover. A squealer tip extends outwardly from the tip cap, and comprises a plurality of spaced-apart notches formed in the airfoil proximate the tip cap and between the leading edge and the trailing edge of the airfoil. At least one hole in each notch communicates with the interior void of the airfoil for channeling cooling air from the interior void of the airfoil.

According to another aspect of the invention, each notch is recessed with respect to the first sidewall to form a tip shelf.

According to another aspect of the invention, the squealer tip is integrally-formed with the airfoil.

According to another aspect of the invention, the squealer tip is formed from material welded to the tip cap.

According to another aspect of the invention, the squealer tip includes a spaced-apart, longitudinally-extending array of notches positioned between the leading edge and the trailing edge of the airfoil proximate the tip cap.

According to another aspect of the invention, the at least one hole is formed in the tip shelf of the notch.

According to another aspect of the invention, a pair of holes are formed in the tip shelf of each of the plurality of notches, the tip shelf being substantially normal to the radially-extending axis of the blade and each of the notches having a width in substantial alignment with the width of the airfoil and a height along the radially-extending axis of the blade, wherein the width is greater than the height.

According to another aspect of the invention, the first sidewall is a pressure side sidewall, and the notches are formed in the pressure side sidewall.

BRIEF DESCRIPTION OF THE DRAWINGS

Some aspects of the invention have been set forth above. Other aspects and advantages of the invention will appear as the invention proceeds when taken in conjunction with the following drawings, in which.

DESCRIPTION OF THE PREFERRED EMBODIMENT AND BEST MODE

Figure 1:
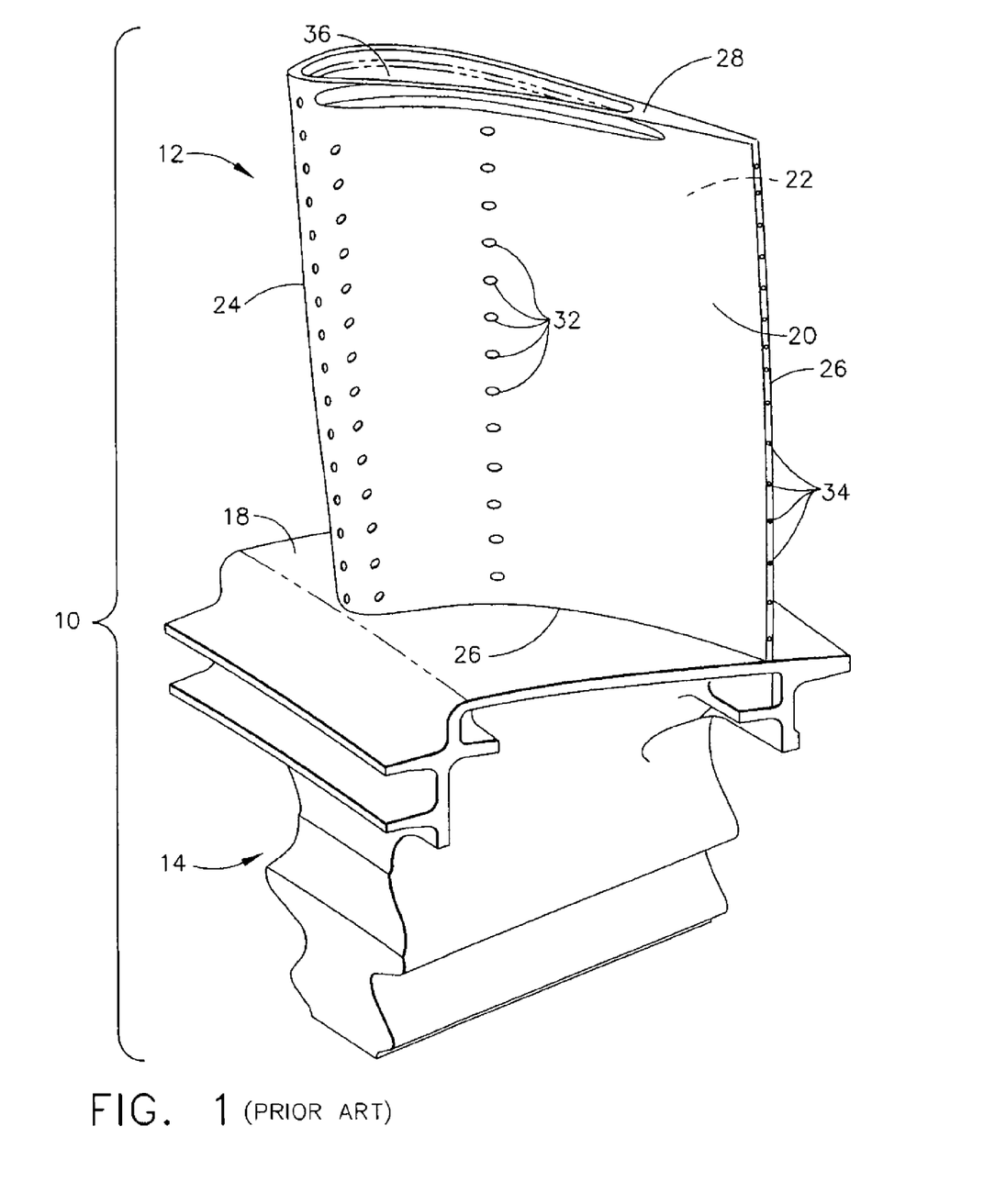
FIG. 1 is a perspective view of an exemplary gas turbine engine rotor blade disk having a tip in accordance with the teachings of U.S. Pat. No. 6,672,829.

Referring now specifically to the drawings, a high pressure turbine blade of a gas turbine engine according to the prior art is illustrated in FIG. 1 and shown generally at reference numeral 10. The blade 10 is mounted directly downstream from a combustor (not shown) for receiving hot combustion gases. Blade 10 extends radially outwardly from a rotor disk, not shown, along a radial axis. Blade 10 includes a hollow airfoil 12 and a dovetail 14 configured for being mounted in a corresponding dovetail slot in the perimeter of the rotor disk.

The blade 10 also includes an integral platform 18 disposed at the junction of airfoil 12 and dovetail 14 for defining a portion of the radially inner flowpath for combustion gases. Blade 10 may be formed in any conventional manner, and is typically a one-piece casting.

Airfoil 12 preferably includes a generally concave pressure sidewall 20 and an opposite, generally convex, suction sidewall 22 extending between opposite leading and trailing edges 24 and 26, respectively. Sidewalls 20 and 22 also extend in the radial direction between a root 26 at platform 18 and an outer tip 28, and are spaced apart over the entire span of airfoil 12 to define at least one internal flow channel 30, see FIG. 3, for channeling cooling air through the airfoil 12. The cooling air is typically bled from compressor (not shown) in any conventional manner.

The inside of airfoil 12 may have any configuration including, for example, serpentine flow channels with various turbulators formed therein for improving cooling air effectiveness, with the cooling air being discharged through film cooling holes 32 and trailing edge discharge holes 34.

Figure 2:
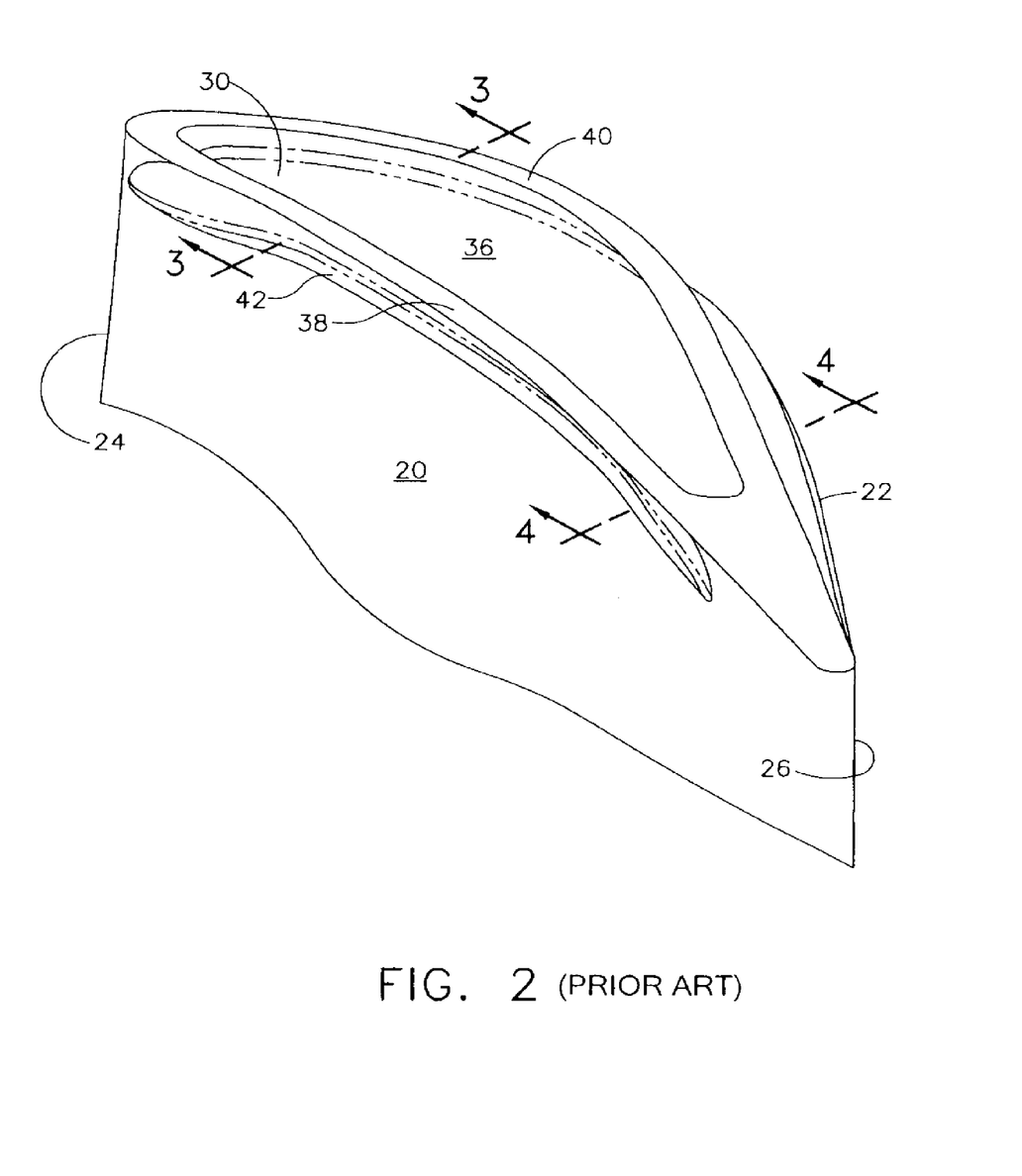
FIG. 2 is an fragmentary enlarged view of the blade tip illustrated in FIG. 1.

As seen in FIGS. 1 and 2, tip 28 preferably includes a tip cap 36 integrally formed atop the radially outer ends of the pressure and suction sidewalls 20, 22, respectively, where the tip cap 36 bounds internal flow channel 30.

As is shown in FIG. 2, a first tip rib 38 preferably extends radially outwardly from tip cap 36 between the leading and trailing edges of the pressure sidewall 20. A second tip rib 40 extends radially outwardly from tip cap 36 adjacent suction sidewall 22. The first tip rib 38 is recessed from the pressure sidewall 20 to form a tip shelf 42 substantially parallel to tip cap 36 as in accordance with the prior art to improve cooling of tip 28.

Figure 3:
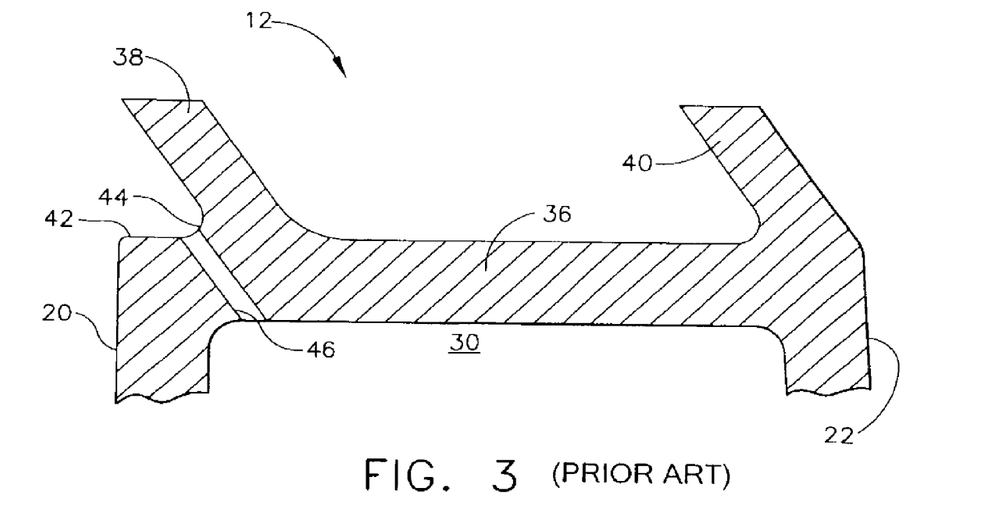
FIG. 3 is an elevational, sectional view through the blade tip illustrated in FIG. 2, taken generally along line 3-3, and depicting a maximum angle between a longitudinal axis through the blade tip ribs and the radial axis.
Figure 4:
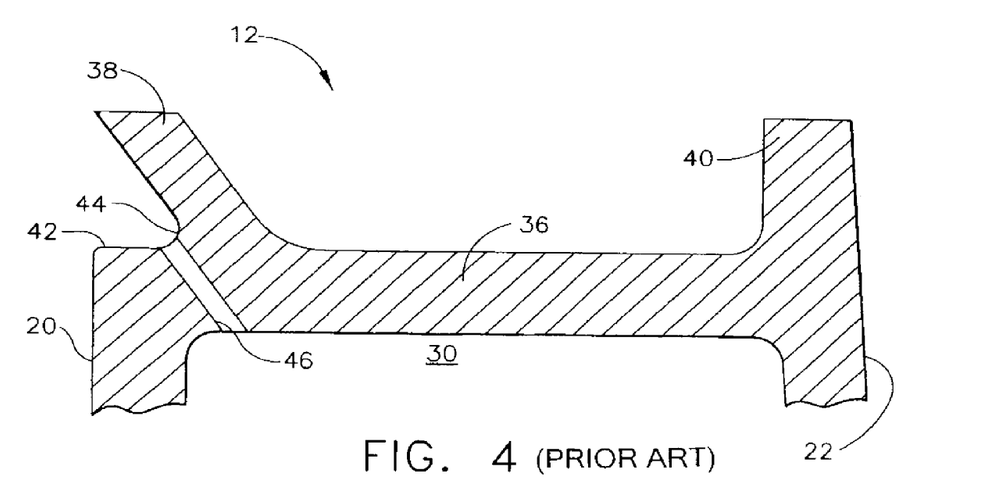
FIG. 4 is an elevational, sectional view through the blade tip illustrated in FIG. 3 within the turbine shroud, taken generally along line 4-4, and depicting a minimum angle between a longitudinal axis through the blade tip ribs and the radial axis.

Referring now to FIGS. 3 and 4, a pocket 44 is formed between the first tip rib 38 and tip shelf 42 which promotes a recirculation of combustion gases. A plurality of cooling holes 46 are preferably provided along the length of tip shelf 42 to provide a cooling film recirculation zone to assist in maintaining a cooling film near first tip rib 38.

As shown in FIGS. 3 and 4, the first tip rib 38 is inclined with respect to the radial axis of the blade, and a longitudinal axis of the second tip rib 40 may be substantially parallel to the first tip rib 38, or may be substantially parallel to the radial axis of the blade 10. The above-described structure is generally referred to as a "squealer tip." Further aspects and details of the blade 10 and its alternative embodiments are found in U.S. Pat. No. 6,672,829.

Figure 5:
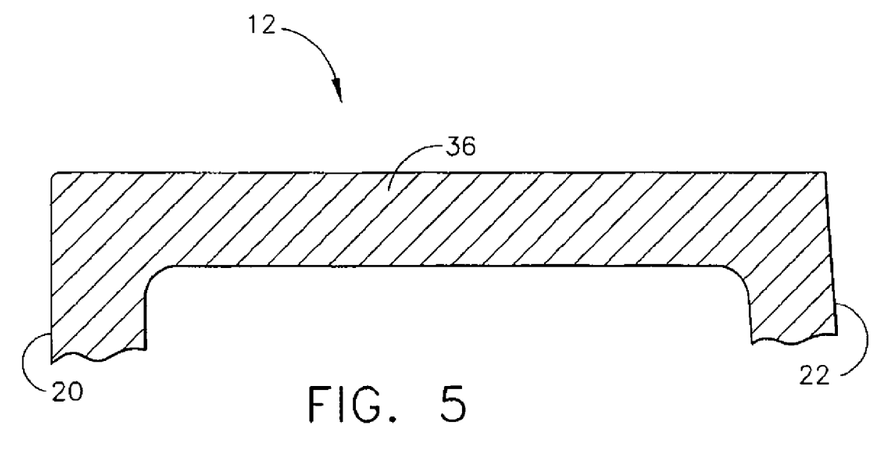
FIG. 5 is a cross-sectional view of the blade tip with the damaged or worn squealer ground off.
Figure 6:
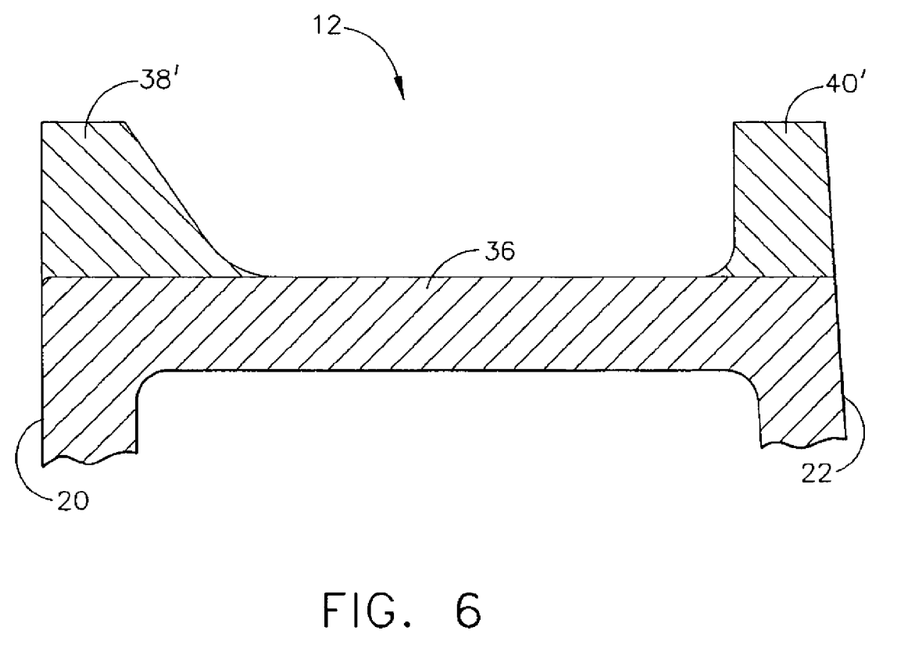
FIG. 6 is a cross-sectional view of the blade tip with additional squealer material added by welding to the top of the blade tip.

Referring now to FIG. 5, it is presumed that the blade 10 has been placed in use and has either been damaged or the tip 28 has worn to the point where replacement is required for continued use. In accordance with one preferred embodiment of the method of the invention, the damaged or worn portions of the tip 28 are ground off by conventional means and the remaining tip cap 36 is dressed and otherwise prepared to receive additional material. As is shown in FIG. 6, material to form new first and second tip ribs 38', 40' is welded to the tip cap 36 to form a blank from which the new blade tip 28' will be constructed. The material used to form the tip ribs 38', 40' may be the same alloy material as the airfoil 12, or an improved alloy. Brazing may also be considered an alternative to welding.

Figure 7:
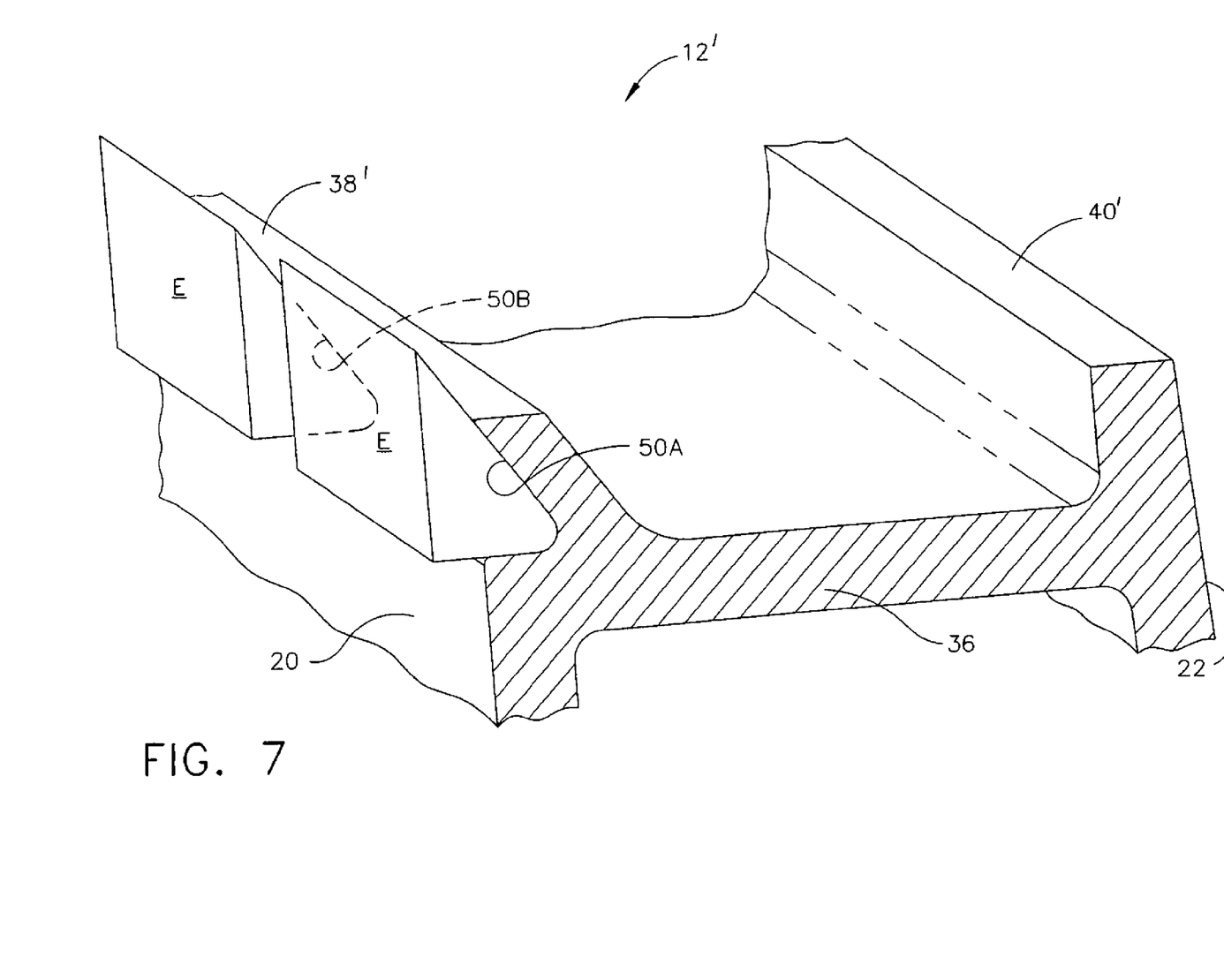
FIG. 7 is a cross-sectional perspective view of the blade tip showing the position of the EDM electrodes.
Figure 8:
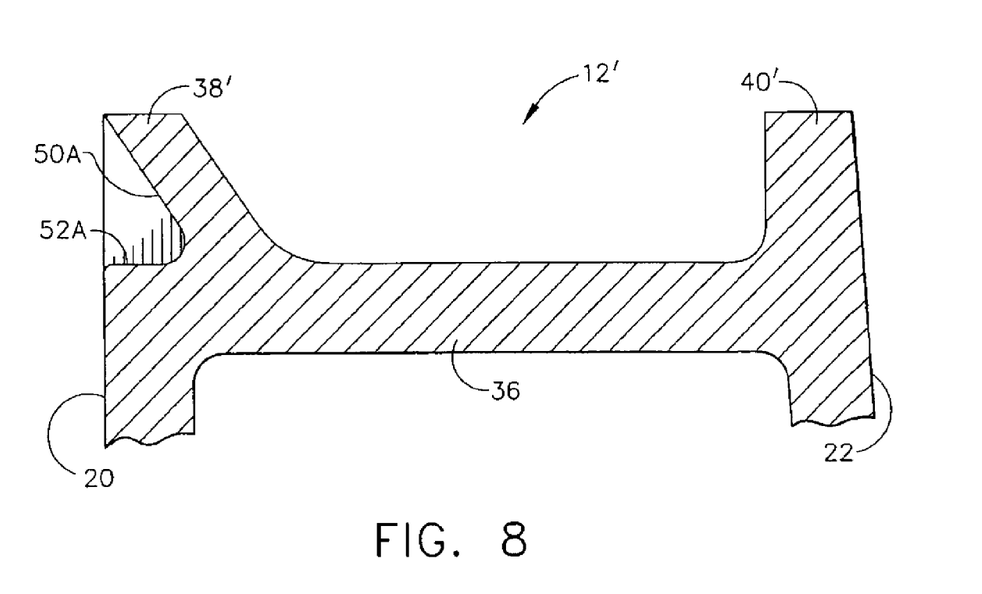
FIG. 8 is a cross-sectional perspective view of the blade tip showing the formation of the tip squealer and film shelf.
Figure 9:
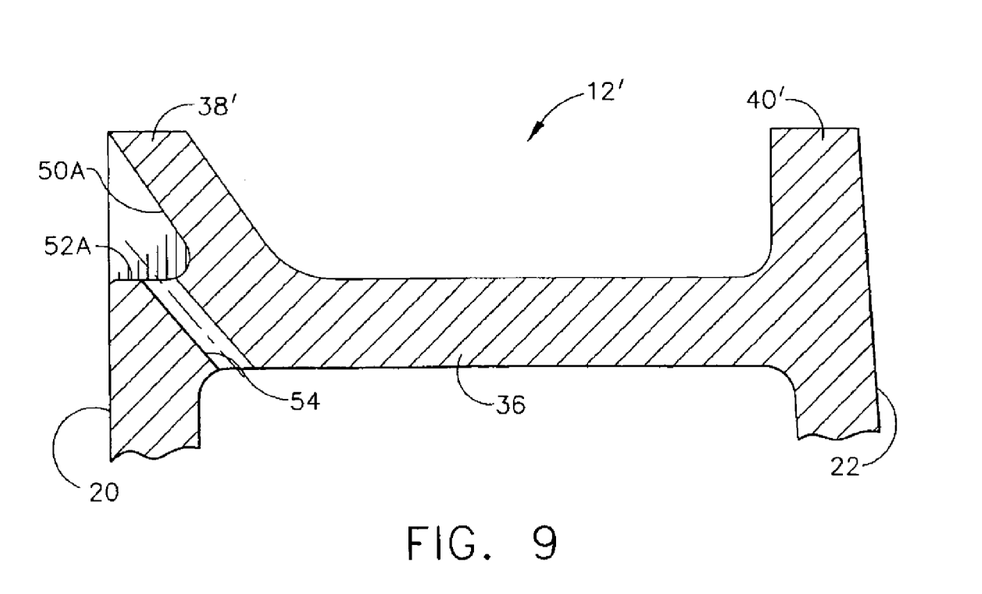
FIG. 9 is a cross-sectional perspective view of the blade tip showing the formation of the film cooling holes in the tip squealer and film shelf.
Figure 10:
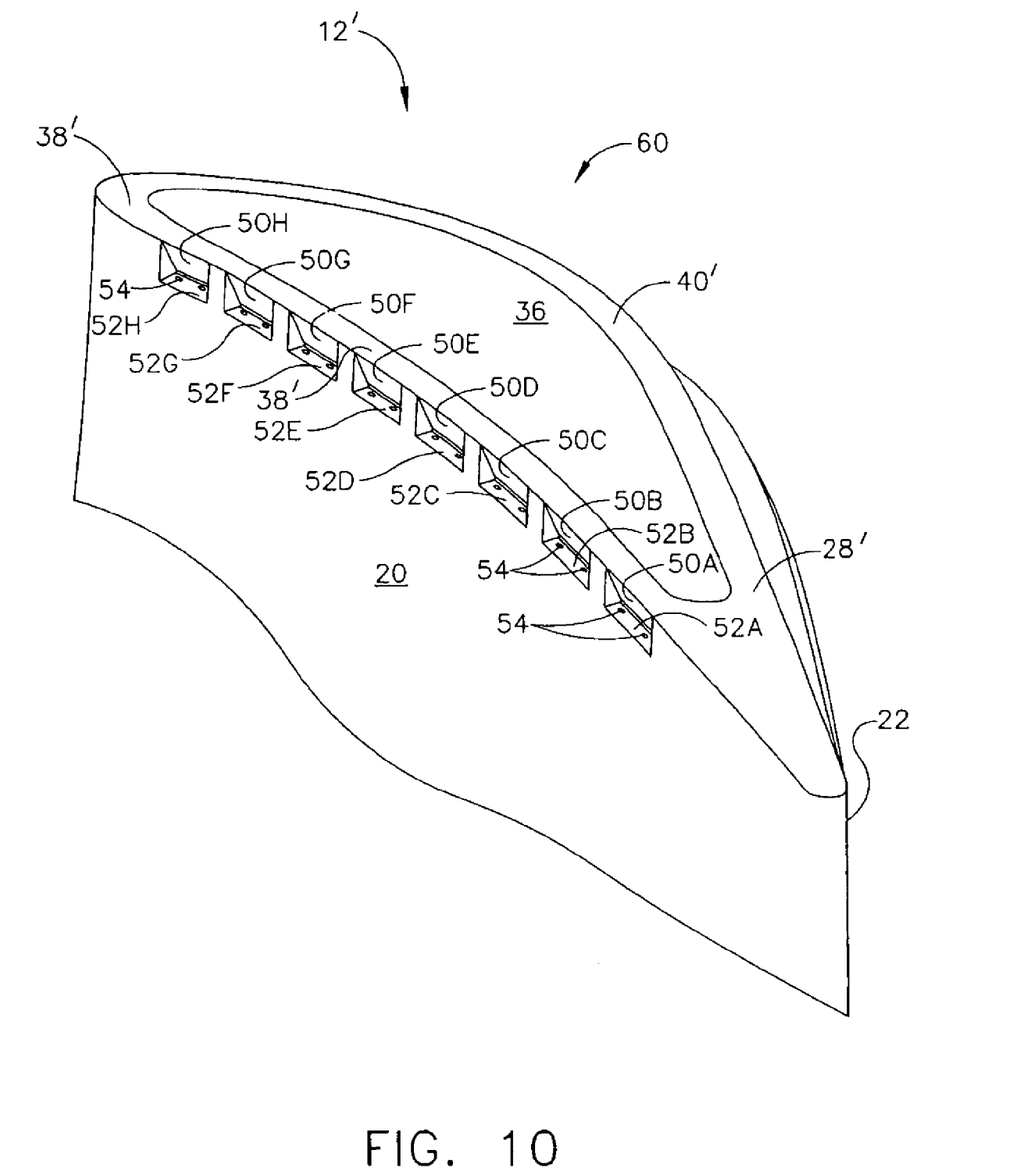
FIG. 10 is an fragmentary enlarged view of the rebuilt blade tip with discrete inclined tip squealer and film shelf notches.

The rebuild method continues by utilizing short, wedge-shaped electrodes "E" in spaced-apart relation along the length of the tip rib 38' of the airfoil 12, as shown in FIG. 7. In an EDM process, notches 50A-50H, see FIGS. 8 and 10, are formed in the first tip rib 38' at the intersection of the tip rib 38' and the tip cap 36. FIG. 10 further illustrates that the notches 50A-50H define respective tip shelves 52A-52H.

After formation of the notches 50A-50H, cooling holes 54 are drilled from the tip shelves 52A-52H through the tip cap 36 and into communication with the hollow interior of the airfoil 12. Note that the holes 54 are preferably parallel to the back wall of the notches 50A-50H.

As shown in FIG. 10, the resulting rebuilt blade 60 has an airfoil 12' with a squealer tip 28' with several discrete tip shelves 52A-52H as distinct from the continuous tip shelf 42 provided on the blade 10 shown in FIG. 1.

Of course, different blade sizes and shapes will determine the number, shape, size and spacing of the notches 50, and the number of holes drilled within each notch—the embodiment described above being provided for purposes of illustration. For example, the walls of the notches 50 may be planar or non-planar, and the vertical sidewalls may diverge radially.

Figure 11:
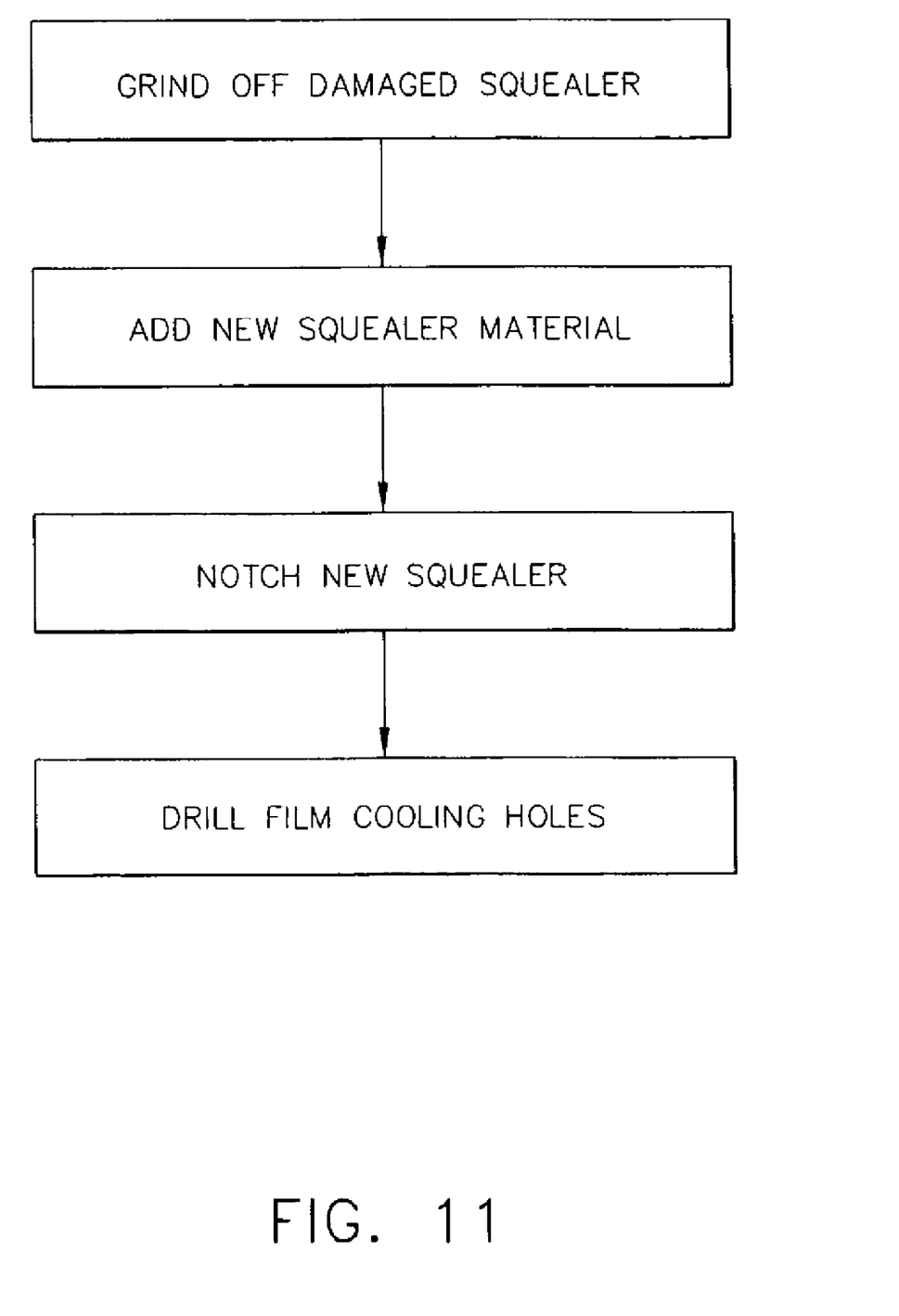
FIG. 11 is a flow diagram of a method of rebuilding a worn or damaged tip squealer.

The method described above is shown schematically in FIG. 11.

The rebuild method described above, and the resulting rebuilt blade 10 have a number of advantages. The EDM process itself is well-known and simple to implement. Each EDM electrode "E" is short and therefore well adapted to being fitted into alignment with the surface curvature of the airfoil 12'. The total cooling surface area inside the notches 50A-50H is greater than the corresponding cooling surface area inside the continuous tip shelf 42 of the airfoil 12 shown in FIG. 1. The overall cooling efficiency is thereby improved without any countervailing disadvantages. The inclined back wall in each of the notches 50A-50H has the similar effect as the continuous inclined squealer tip in reducing tip leakage flow. Even though the notches 50A-50H are discrete and thus form a non-continuous squealer, the majority of the leakage flow reduction is maintained. The method described above can also be used in the casting of the original blade 10 as an alternate to the cast-in inclined squealer tip.

A method of rebuilding the tips of continuous inclined squealer tip turbine blades, and the resulting rebuilt blade are described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A method of rebuilding a turbine blade for a gas turbine engine, the blade being of the type including an airfoil having first and second spaced-apart sidewalls defining an interior void and joined at a leading edge and a trailing edge, the first and second sidewalls extending from a root to a tip cap, and a squealer tip including at least one tip rib extending outwardly from the tip cap, the method comprising the steps of:

(a) removing the squealer tip, including the at least one tip rib, from the tip cap;
    (b) adding new material to the tip cap to serve as a new squealer tip;

(c) forming a plurality of spaced-apart notches in the new material between the leading edge and the trailing edge of the airfoil, wherein each notch is recessed with respect to the first sidewall to form a respective tip shelf, and further wherein each notch is defined by a top wall oblique with respect to a plane perpendicular to a longitudinal axis of the blade and oblique to the first and second spaced-apart sidewalls, and the respective tip shelves are perpendicular to a surface of the first and second spaced-apart sidewalls; and (d) forming at least one hole in each tip shelf communicating with the interior void of the airfoil for channeling cooling air from the interior void of the airfoil to thereby form a squealer tip.

2. A method according to claim 1, wherein the step of removing the squealer tip from the tip cap comprises the step of grinding the squealer tip off of the airfoil.

3. A method according to claim 1, wherein the step of adding new material to the tip cap to serve as a new squealer tip comprises the step of welding at least one metal blank onto the tip cap.

4. A method according to claim 1, wherein the step of forming a plurality of spaced-apart notches in the new material between the leading edge and the trailing edge of the airfoil comprises the steps of:

(a) providing EDM electrodes having a predetermined shape suitable for forming the notches;

(b) applying the EDM electrodes to predetermined positions on the airfoil; and (c) utilizing the EDM electrodes to electrically discharge machine the notches into the new material.

5. A method according to claim 1, wherein the step of forming at least one hole in each tip shelf comprises the step of drilling the hole.

6. A method according to claim 1, wherein the step of forming the at least one hole comprises the step of drilling a plurality of holes in each tip shelf.

7. A method according to claim 1, wherein the step of forming a plurality of spaced-apart notches in the new material comprises the steps of:

(a) providing EDM electrodes having a predetermined shape suitable for forming the notches;

(b) applying the EDM electrodes to the new material in a spaced-apart, longitudinally-extending array between the leading edge and the trailing edge of the airfoil proximate a top edge thereof; and (c) utilizing the EDM electrodes to electrically discharge machine the notches into the new material.

* * * * *